3,498,898
METHOD FOR PROVIDING CORROSION PROTECTION FOR AUTOMOBILE BODIES
Harold N. Bogart, Detroit, George E. F. Brewer, Novi, and Gilbert L. Burnside, Oak Park, Mich., assignors to Ford Motor Company, Dearborn, Mich., a corporation of Delaware
Filed July 25, 1967, Ser. No. 657,467
Int. Cl. B01k 5/02; C23b 13/00; C23f 13/00
U.S. Cl. 204—181                        6 Claims

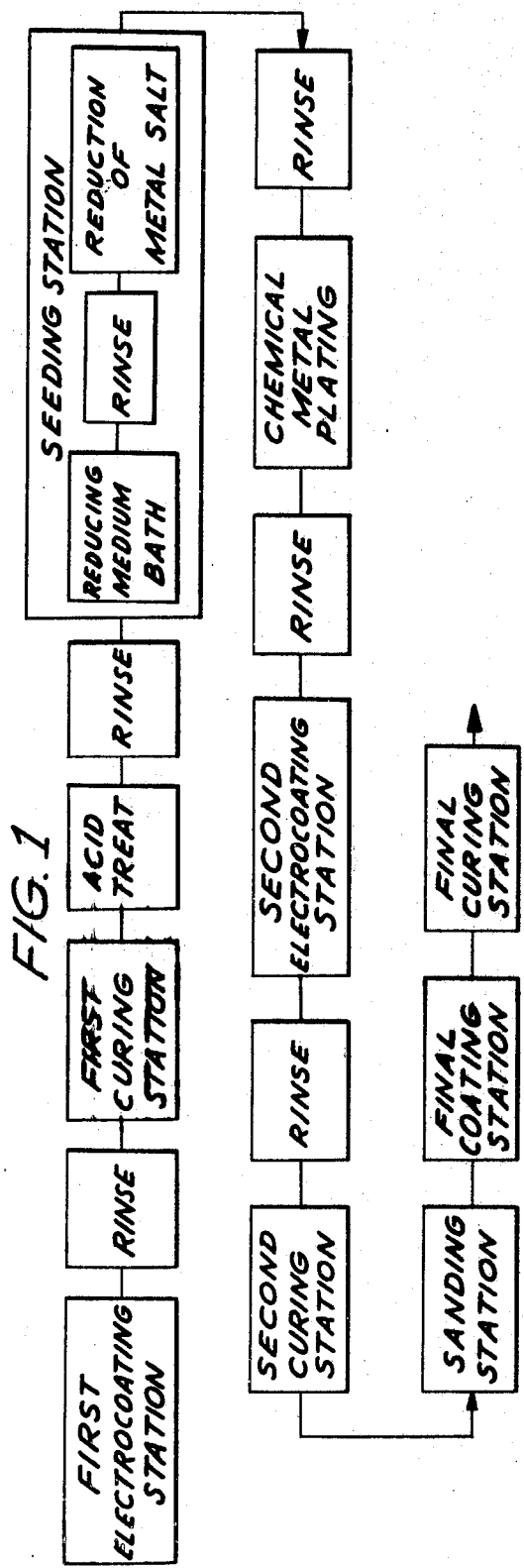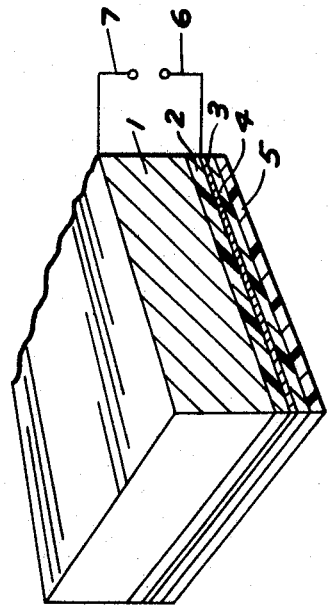
HAROLD N. BOGART
GILBERT L. BURNSIDE
GEORGE E.F. BREWER
INVENTORS
BY John R. Faulkner
Olin B. Johnson
ATTORNEYS

United States Patent Office 3,498,898
Patented Mar. 3, 1970

ABSTRACT OF THE DISCLOSURE

A method of protecting a metallic automobile body from electrolyte or galvanic corrosion which comprises electrodepositing a first continuous coating of paint upon said body, polymerizing said first coating thereon to an average electrical resistance in excess of about 1 million ohm-cm., applying a continuous, adherent, electrically-conductive layer of metal upon the polymerized paint by chemical plating, anodically depositing a second, continuous coating of paint upon said layer of metal, providing electrical connection between said body and a direct current electrical power source, providing electrical connection between said layer of metal and said power source, and maintaining a difference of electrical potential between said body and said layer of metal that is quantitatively and directionally sufficient to reduce or prevent corrosion of said body when said body is exposed to an electrolyte through a break in the continuity of coating thereon.

Background of the invention

It is well known that the metallic surfaces of objects surrounded by liquids or moist solids can be protected from electrolytic corrosion through the application of an electric current. Such a system consists of essentially four components: the object to be protected which acts as one electrode, a sufficiently conductive medium, an electrode of different potential, and an electric power source.

In the past, such protective systems have been used for the protection of ships in salt water environments, underground installations, tanks containing corrosive liquids, etc., i.e. in those cases in which nature or the use of the object provided a sufficient conductive separation between the electrode of one polarity and the surface to be protected which forms the electrode of the other polarity at the time when protection is needed.

Cathodic protection has been widely used and therefore is widely described in the literature. Cathodic protection consists of making the object to be protected the cathode of an electrolytic cell, providing an anode, providing a difference of electrical potential and a direct current of electrical energy through the electrolyte therebetween with a direct current, electrical power source. Cathodic protection is the reversal of the normal electron flow from metal to positive ion. It is reported by Wilburn in U.S. Patent 3,151,050 that the potential necessary to reverse the work function of the normal corrosion of steel has been found to be −0.80 to −0.85 volt with respect to the anodic electrode. Current densities used were between 0.0064 and 0.96 milliampere per square inch of surface area to be protected. Conventionally, the anode has been sacrificial in this system.

In anodic protection, otherwise termed anodic passivation, the metallic surface to be protected is maintained at a constant potential with respect to a reference electrode by passing a current between the metallic surface to be protected and a cathode disposed in the corrosive liquid. In this case, the metallic surface corresponds to an anode and the corrosive fluid serves as an electrolyte for conducting the current from the anode to the cathode. In U.S. Patent 3,147,204, Shepard et al. recite the use of potentials ranging from 1 to 10 volts to provide a minimum current density of 5 milliamperes per square foot at the surface to be protected and state that, in general the required minimum voltage potential between the electrolyte and the surface to be protected will be on the order of 0.8 volt. However, it is pointed out therein that the magnitude of the anodic potential required must be empirically determined for each application. In any case, sufficient electrical potential is applied to maintain all local areas of the surface to be protected at a positive potential. For a given system, the impressed potential providing optimum results is more critical than in the case of cathodic protection. Anodic passivation is described in detail in U.S. Patents 2,366,796; 3,009,865; 3,147,204 and 3,216,916 which are incorporated herein by reference.

The art of electrophoretic deposition of organic materials such as rubber, wax, polytetrafluoroethylene, natural resins, and certain nonionic synthetic polymers from colloidal dispersions of the same is widely described in the literature. More recently, industrial electrodeposition of paint has become a reality through a method of electrodeposition utilizing ionized macromolecules to produce upon conductive substrates resinous paint films which exhibit high electrical resistance. The resins most suitable for this purpose are polycarboxylic acid resins, i.e. organic resins having dissociable carboxyl groups in their molecular structure. These are dispersed in an aqueous bath with water soluble amines or similar water soluble amino compounds.

In this method of painting, the workpiece serves as one electrode of an electrodeposition cell and the aqueous dispersion of paint extends between the workpiece and another electrode while a direct current of electrical energy is passed through this dispersion with resultant electrodeposition of a resin film upon the workpiece. This film rapidly achieves high electrical resistance causing further deposition to be directed toward uncoated or lightly coated areas of the workpiece where the current density is initially less than at the areas first coated but is still within the effective coating range of the electrode system employed.

In the electrodeposition of a polycarboxylic acid resin, the workpiece serves as the anode of the electrodeposition cell and the noncoating electrode serves as the cathode. A number of such resins are described by Gilchrist in U.S. Patent 3,230,162 and by Huggard in U.S. Patent 3,297,557 which patents are incorporated herein by reference.

Ordinarily, electrodeposition of coating materials as hereinbefore and hereinafter described is effected by immersing the workpiece in an aqueous coating bath. Such deposition can also be effected by passing a continuous stream of the dispersion in contact with an electrode and simultaneously in contact with the workpiece while providing a sufficient difference of electrical potential between the electrode and the workpiece to effect electrodeposition of a water-insoluble film of such coating material from the stream onto the workpiece.

The depth of such film can be varied by varying the effective potential applied with resultant variance of current density at the workpiece surface, the residence coating time, the formulation of the coating bath, etc. The upper depth limit of such deposit is dependent upon the composition of the paint binder employed since electrical rupture characteristics of the binder will limit the difference of electrical potential that can be advantageously employed between the electrodes in the given bath arrangement. The high electrical resistance developd by the electrodeposited film promotes coating of shielded areas and areas less easily coated as a result of location, etc., such deposition tending to be self-leveling. This film resistance also limits coating depth at a given constant voltage under any given electrode arrangement.

Chemical plating of surfaces with a thin coating of metal, e.g. nickel, copper, silver, gold, tin, cobalt, etc., is an established art. The term "chemical plating" as employed in this art and in this specification refers to the chemical reduction of ions of the plating element to elemental form upon the catalytic surface to be plated. This method is most widely used and is best known with respect to nickel plating. Primarily, it is this embodiment that will be used for illustration in this specification. The chemical plating of nickel upon a catalytic surface from an aqueous bath is based upon the catalytic reduction of nickel cations to metallic nickel and the corresponding oxidation of hypophosphite anions to phosphite anions with the evolution of hydrogen gas at the catalytic surface. This reaction is catalytic and autocatalytic, its initiation usually being accomplished by way of the catalytic effect of the article being plated and its continuance being catalyzed by the nickel which is deposited. The literature discloses iron, cobalt, nickel, ruthenium, rhodium, palladium, osmium, iridium and platinum as catalytic for these reactions. The following U.S. Patents are illustrative of this plating process: 2,501,737; 2,532,283; 2,532,284; 2,581,310; 2,624,684; 2,658,841; 2,694,017; 2,695,249; 2,658,842; 2,717,218; 2,726,969; 2,762,723; 2,774,688; 2,816,846; 2,819,187; 2,795,040; 2,819,188; 2,822,293; 2,822,294; 2,827,399; 2,837,445; 2,871,142; 2,872,353; 2,872,354; 2,874,073; 2,886,451; 2,886,452; 2,896,116; 2,916,401; 2,975,073; 2,977,244; 3,041,198; 3,202,529; 3,268,353; and 3,282,723.

If the surface to be plated is not catalytic, it can be rendered catalytic. Thus, this method of plating has been extended to the plating of nonconductive and noncatalytic substrates, e.g. plastics, hard rubber, ceramics, etc., by implanting catalytic growth nuclei upon the surface to be plated. These nuclei catalyze the initial reduction of nickel from the plating bath and the nickel thus deposited catalyzes further reduction of nickel cations to complete the plating of the surface. The following U.S. Patents are illustrative of chemical plating of nonconductive and noncatalytic substrates: 2,690,401; 2,690,402; 2,690,403; 2,848,359; 2,996,408; 3,015,014; 3,075,855; 3,075,856; 3,095,309; 3,179,575; and 3,186,863.

In the plating of nonconductive and noncatalytic substrates, the usual procedure is to first freshen the surface to be plated. The literature discloses a variety of methods for this including buffing, sanding, chemical etching, etc. This is followed by planting the catalytic nuclei, as for example, by reducing palladium ions from a dilute aqueous solution of a palladium salt, e.g. the chloride, nitrate, bromide, or sulfate, to palladium metal upon the surface to be plated. This is effected by immersing the surface to be plated in an aqueous solution of the salt of the catalytic metal, rinsing, and subsequently immersing the surface in a reducing solution. Reducing solutions disclosed in the literature include aqueous solutions of hypophosphorous acid, hydrazine hydrochloride, hydroquinone, etc. In a variation of this method, the surface is first immersed in an aqueous solution of stannous chloride, rinsed and subsequently immersed in the seeding solution. Other methods include forming the nonconductive and noncatalytic body with particles of the catalyst imbedded therein so as to project at the surface or to mechanically impregnate the surface with catalyst after forming.

The plating of metallic surfaces with nickel and other metals by electrodeposition is also well known to the art. The electrolytic process is reversible and the amount of nickel, silver, copper or other metal removed from the plate metal-source electrode can be readily calculated when the quantitative flow of electrical energy between such electrode and the electrode to be plated is known.

Summary of the invention

Corrosion of automobile bodies, frequently accelerated by the use of salt upon streets and highways during winter months, has been the subject of considerable concern and study. Such vehicles conventionally obtain external protection from the paint applied thereon. Contrariwise, it is conventional in anodic and cathodic protection systems to have all or major amounts of the surface to be protected exposed to the electrolyte.

Obtaining a complete coating of paint upon all corrosion susceptible surfaces of an automobile is feasible when such paint is electrodeposited. If small areas are not covered, or if a break occurs in the paint later, a potential corrosion site is created.

It has been discovered that effective corrosion protection at such lesions can be achieved by electrodepositing upon the body a paint which cures to a high electrical resistance, polymerizing the deposited paint, applying a thin, adherent, continuous and electrically conductive layer of metal upon the polymerized paint, preferably by chemical plating although vacuum metalizing or other techniques may be used which are compatible to the overall process, electrodepositing a continuous coating of paint over the layer of metal, and providing a suitable difference of electrical potential between the body and the layer of metal at the break in the protective coating. The potential to provide protective current between the body and the layer of metal is then available when a break occurs and an electrolyte enters the break.

While anodic and cathodic protection systems have been successfully employed in many fields, they have not heretofore found useful employment with respect to automobiles. Even with the advent of electrodeposition of paint, the instant system appeared impractical since the number of coulombs now required to anodically deposit a coating of paint of conventional thickness over the layer of metal is in excess of, normally 2 to 4 times as great as, the number of coulombs necessary to cathodically deposit that amount of metal.

The term "automobile" is herein used in the generic sense which includes trucks and motor buses in addition to private passenger motor vehicles.

It is preferred to use for such electrodeposition a paint in which the predominant fraction of the film-forming binder is a synthetic polycarboxylic acid resin having an acid number of at least about 10, preferably above about 30, and is readily dispersible in water with a water soluble amine. In the coating bath, this synthetic polycarboxylic acid resin is at least partially neutralized with a sufficient quantity of water soluble amine or other water soluble amino compound to maintain the acid resin as a dispersion of anionic polyelectrolyte in said bath. This paint is polymerizable to an average electrical resistance of above about 1 million ohm-cm., preferably above about 10 million ohm-cm.

In accordance with the method of this invention, the coating of paint applied immediately to the substrate and the coating of paint anodically deposited over the layer of metal applied by chemical plating each have an average thickness in excess of about 0.3 mil (0.0003 inch), advantageously in the range of about 0.5 to about 1.5 mils, and preferably in the range of about 0.7 to about 1.25 mils.

The metal chemically plated over the painted workpiece may be nickel, copper, silver or other chemically platable metal. In depth, the metal film need only be continuous and of sufficient thickness to provide good electrical conductivity. For the purposes of this invention, such layer advantageously does not substantially exceed about 0.03 mil average thickness. Ordinarily, the depth of the layer will be in the range of about 0.001 to about 0.01 mil, commonly between about 0.0001 and about 0.005 mil.

Brief description of the drawing

FIGURE 1 is a block type of flow diagram illustrating a method for preparing an automobile body for anodic or cathodic protection in accordance with this invention; and FIGURE 2 is a partially sectional view of a fragment of an automobile body illustrating the electrical connections utilized in anodic or cathodic protection thereof together with the nonconductive coatings associated therewith.

Description of the preferred embodiments

Referring now to FIGURE 1, at the first electrocoating station an automobile body is immersed in an aqueous dispersion of paint which also comprises the electrolyte of an electrodeposition cell. The metal workpiece is electrically connected with the coating circuit of such cell while immersed in said dispersion so as to serve as the anode of such cell. The aqueous coating dispersion comprising the coating bath is prepared in the following manner:

An extended coupled glyceride drying oil paint binder is made by reacting in an agitator tank 8,467 parts of alkali-refined linseed oil and 2,025 parts of maleic anhydride (heated together at 232.2° C. for about three hours until an acid value of 80–90 results), then cooling this intermediate to 157.2° C., adding 1,789 parts of vinyl toluene containing 48 parts of ditertiary butyl peroxide and reacting at 218.3° C. for about an hour. The resulting vinyl toluenated material is then cooled to 157.2° C. and 5,294 parts of non-heat reactive, thermoplastic, oil-soluble phenolic resin is added, the temperature raised to 232.2° C. and the mixture held one hour. The phenolic resin is a solid lump resin having a softening point of 120–150° C., specific gravity of 1.03–1.05 at 20° C., and has been stripped to get out excess phenol and low molecular weight materials. It is a condensation product of about equimolar quantities of para tertiary butyl phenol and formaldehyde. The electrical equivalent weight of the resulting acid resin as extended is about 1,640, and it has acid number of 65. A method for determining electrical equivalent weight is described in detail in the aforementioned Gilchrist patent.

The material then is cooled to 93.03° C., and 1,140 parts are taken for forming a paint dispersion. To these 1,140 parts, 100 parts of water are added, then 13.6 parts of triethylamine, the mixture agitated for a few minutes, then 74 more parts of water and 92.5 parts diisopropanol amine added. This mixture is further reduced with 1,825 parts water and 32.5 parts diethylene triamine while agitation is continued.

To this paint dispersion there is added 50 parts of a treating mixture of mineral spirits, a light hydrocarbon liquid having A.P.I. gravity of 45–49.5, specific gravity at 15.6° C. of 0.78–0.80, flash point (Cleveland Open Cup) between 37.8–46° C., a negative doctor test and no acidity, 12 parts of a wetting agent (the oleic ester of sarcosine, having a maximum of 2% free fatty acid, a specific gravity of 0.948, color on the Gardner scale of 6, and a molecular weight of 340–350). This material is compatible with the paint dispersion; no distinct hydrocarbon phase results either at this time, even though a substantial amount of hydrocarbon predominantly aliphatic) has been used, nor after further addition of the pigment grind and addition of extra water to make the initial painting bath.

A pigment grind is made from 123 parts of vinyl toluenated, maleic-coupled linseed oil made in the same manner as the resin hereinbefore shown (except that the resulting polycarboxylic acid resin is not extended with the phenolic resin), 8.4 parts of diisopropanol amine, 0.7 part of an antifoam agent (a ditertiary acetylenic glycol with methyl and isopropyl substitution on the tertiary carbon atoms), 233 parts of fine kaolin clay, 155 parts of pigmentary titanium dioxide, 7.8 parts of fine lead chromate, 15.5 parts of fine red iron oxide, 16.9 parts of carbon black, and 201 parts of water. The resulting pigment grind is then blended with the foregoing paint dispersion and treating mixture to make a concentrated paint. The resulting paint is reduced further with water in the ratio of one part of the resulting paint per 5 parts of water to make an initial painting bath for electropainting operations. The resulting bath has resin solids (non-volatile matter) concentration of 7.24%. The total of amine equivalents used in making up the initial bath is about 4.5 times the minimum amount necessary to keep this polycarboxylic acid resin, once dispersed, in anionic polyelectrolyte condition in the bath and about 1.25 times full neutralization of the acid resin with respect to its acid number. The number of coulombs of direct current used to electrodeposit a gram of this resin on an anode at minimum amine concentration in the bath to develop requisite polyelectrolyte characteristics for this coating process is virtually constant at 24. Specific resistance of the initial bath is about 900 ohm-centimeters.

The replacement paint solids are made by dispersing 1,140 parts of the same kind of extended polycarboxylic acid resin with 100 parts of water and 13.6 parts of triethylamine. To this is added the mineral spirits, the wetting agent, and the foregoing pigment grind, all of the same compositions and in proportions as are used to make up the original paint dispersion for the bath.

The tank containing the coating bath serves as the cathode of this cell. A difference of electrical potential in the range of about 50 to about 1000, preferably about 100 to about 300, volts is maintained between the automobile body-anode and the cathode and a direct current of electrical energy is thereby initiated through the bath between anode and cathode with resulting anodic deposition of paint from the bath upon all surfaces of the automobile body. The automobile body-anode is immersed in the bath until a paint film having an average thickness of about 1 mil is deposited thereon. It is then removed, rinsed with water which may include a detergent.

The painted body is then passed to the first curing station where this coating is polymerized in air maintained at a temperature of about 400° F. for about 25 minutes.

The painted automobile body is next immersed in an acid etching bath for about 2 minutes. This bath is maintained at a temperature of about 135° F. and comprises water, potassium dichromate and sulfuric acid. The quantitative ratio of the components used in making up this bath are about 37.5 grams of potassium dichromate and about 2500 cc. of concentrated sulfuric acid (66° Baumé) to 5,000 cc. water. The etched body is then removed from the etching bath and rinsed thoroughly with water. It is then immersed in an aqueous bath comprising a 5% sodium hydroxide solution for about 10 seconds at about 75° F. to neutralize any remaining etchant upon the surface of the workpiece. The body is again rinsed with water.

The etched body is next passed to the seeding station. Here, it is first immersed in a reducing bath comprising an aqueous solution of stannous chloride (20 grams per liter). This bath is maintained at about 75° F. and the body is in residence for about 2 minutes. The workpiece is removed from this bath and again rinsed with water. The workpiece is next immersed in a seeding bath. This bath comprises water, hydrochloric acid and palladium chloride. Palladium ions from this solution are reduced to palladium at a plurality of sites upon the etched paint surface which retains minute amounts of stannous chloride ions. The quantitative ratio of the components used in making up this bath are about 10 cc. concentrated hydrochloric acid (37–38%) and 0.75 gram of palladium chloride to about 3775 cc. of water. This bath is maintained at room temperature. The workpiece is again thoroughly rinsed with water.

The palladium-seeded body is then moved to the chemical plating tank and immersed therein for about 5 minutes. This bath is maintained at about 190° F. and comprises an aqueous solution of nickel sulfate, sodium citrate, sodium acetate, sodium hypophosphite, and magnesium sulfate. The quantitative ratio of the components used in making up this bath are about 35 grams/liter nickel sulfate, 10 grams/liter sodium citrate, 10 grams/liter sodium acetate, 15 grams/liter sodium hypophosphite, and 20 grams/liter magnesium sulfate. About 10 cc. of a wetting agent, sodium lauryl sulfate, is advantageously added to this bath. The body is then removed from the chemical plating bath with a continuous nickel film covering the continuous coating of paint which forms the immediate covering of the workpiece. It is then rinsed with water.

The nickel coated workpiece is then moved to the second electrocoating station where a polycarboxylic acid comprising paint is electrodeposited thereon in the same manner hereinbefore described for anodically depositing the first coating upon the workpiece. The coating dispersion used for this coating step is prepared in the following manner:

Thirty-one pounds of red iron oxide and fifty-one pounds of lead silico chromate are dispersed in a pebble mill with a mixture of 1¼ gallons of water and 4 gallons of a water reducible vehicle prepared in the following manner:

A mixture of 878 parts tung oil and 203 parts fumaric acid are heated to 420° F. and held at this temperature for ten minutes and then cooled to 250° F. The adduct product is clear. A cut in xylene at 65% non-volatile resin solids has a viscosity of U–V (Gardner-Holdt) and an acid number of 158.4. The resin is reduced to 40% nonvolatile resin solids in a blend of 79% (by weight) water, 15% ammonium hydroxide (28%), and 6% ethanol. The viscosity is X–Y (Gardner-Holdt).

The resulting paste is then reduced with an additional 33⅓ gallons of the above described water reducible vehicle. To the resulting pigment-resin mixture is added, under agitation, an oil soluble partially esterified styrenated-allyl alcohol copolymer resin solution which consists of 40.3% styrene-allyl alcohol copolymer, 14.2% nonheat-hardening phenol formaldehyde, 11.4% rosin, 25.6% tall oil fatty acid (4% rosin acid), and 8.5% oiticica oil processed to an acid value of 44 to 46 and reduced to 72.5% non-volatile resin solids in a mixture of aromatic hydrocarbon solvents having a boiling range of about 375–410° F.

After the 72.5% solids solution, described above, has been added to the pigment dispersion-resin mixture, 33 gallons of water are added under agitation. The resulting emulsion is approximately 42 percent solids and has a viscosity of 14–20 seconds measured in a #4 Ford cup at 80° F.

This emulsion is further reduced with the addition of 300–600 percent of its volume of water.

In the electrodeposition of the above described coating composition over the chemically plated layer of nickel, electrode contact with the nickel film is effected by clamping a steel wool pad between the nickel film and the anodic lead.

The last deposited coating is then moved to the second curing station and baked at an air temperature of about 400° F. for about 25 minutes.

In this embodiment, the body next moves to a conventional sanding station where the exposed surface of paint is checked for blemishes and sanded where necessary prior to application of a finishing coat. The workpiece then proceeds to one or more coating stations where a finish coat, e.g. enamel or lacquer, is applied by spraying or other conventional paint application means before passing to the final curing station.

FIGURE 2 is illustrative of a metal substrate coated in accordance with the embodiment above described. Upon the substrate 1 there is shown the first electrodeposited paint 2. Immediately below paint 2 is a layer of chemically plated nickel 3. The depth of the nickel layer is here shown enlarged with respect to the adjoining paint layers to facilitate its identification and location on the drawing. Immediately below the nickel layer, there is shown a second electrodeposited paint 4 which in turn is followed by a finish paint 5. In electrical connection with the nickel layer 3 is a conductor 6 which serves as an electrical power source not shown, e.g. an electric storage battery. In electrical connection with the substrate 1 is a conductor 7 which serves as an electrical lead to the aforementioned electrical power source.

In a first embodiment, conductors 6 and 7 are connected with the power source in a manner such that the substrate 1 constitutes the cathode of the protection cell and the metal layer 3 constitutes the anode. The paint 2 having an electrical resistance in excess of about 1 million ohm-cm. provides effective insulation between substrate 1 and metal layer 3 until a break occurs in the paint and the break is exposed to an electrolyte such as salt water. If minor flaws occur in the coating process resulting in direct connection between metal layer 3 and substrate 1, such connection can be destroyed by providing sufficiently high difference of electrical potential between conductors 6 and 7 to destroy the connection. In this embodiment, the operating potential impressed between the substrate or cathode 1 and the layer of metal or anode 3 is sufficient to provide a protective electron flow with respect to the substrate and is insufficient to effect significant dissolution of the metal layer. Numerically speaking, the upper limit on such voltage will be dependent upon the choice of metal for layer 3. The abundant existing literature on cathodic protection provides adequate guide for optimum voltage and current for specific metals.

In a second embodiment, the polarities of conductors 6 and 7 are reversed and the substrate 1 is made the anode of the cell while the metal layer 3 is made the cathode. The impressed voltage is calculated from the literature of anodic protection to provide maximum electrical passivity of the substrate 1.

A further study of the method of this invention was made upon zinc phosphate treated steel panels with commercially available, polycarboxylic acid resin comprising paints and commercially available chemical plating solutions.

In one such study, a first coating of a polycarboxylic acid resin comprising automobile primer was electrodeposited from an aqueous bath upon the test panel. The difference of electrical potential between anode and cathode was maintained at about 180 volts. The curing, etching and seeding steps hereinbefore described were employed to prepare the surface of the paint for chemical plating. A layer of silver was chemically plated over the seeded surface by conventional chemical plating techniques. A polycarboxylic acid comprising black enamel was then electrodeposited over the layer of silver and cured by conventional baking.

In another such example, a first coating of another polycarboxylic acid resin comprising automobile primer was electrodeposited from an aqueous bath upon the test panel. The conditions of electrodeposition were immersion for 2 minutes at 75° F., the impressed potential was 180 volts, the maximum current was about 4.65 amps/ft.$^2$, and current at termination was about 0.135 amp/ft.$^2$. The coating obtained measured 0.7 mil in thickness. The coating was cured, acid etched, and seeded with palladium as in the previous examples. The seeded coating was then chemically plated with nickel and immersed in an electrodeposition bath containing an aqueous dispersion of another polycarboxylic acid resin comprising paint. The immersion time for this coating step was 2 minutes at 75° F. The coating potential was about 200 volts. Current density ranged from about 2.25 amps/ft.$^2$ at coating initiation to about 0.195 amp/ft.$^2$ at coating termination.

A cut made through the coatings to the substrate and the substrate is immersed in salt water. Electrical connections are again made with the power source so that the substrate and the layer of metal are alternately cathode and anode. Potentials of 0.1, 0.5 and 0.8 volt are impressed across the cut or paint lesion when the substrate is employed as the anode. Potentials of 0.3, 1.0, 2.5 and 5.0 volts are impressed across the cut or lesion when the substrate is employed as the cathode.

Oxide films characteristically form upon a ferrous metal substrate under weathering conditions and the impressed voltage and current should be sufficient to prevent dissolution of such films. Such films have a high electrical resistance and protect the metal from further electrolyte corrosion while intact.

In this application, "painting" by electrodeposition is meant to include the deposition of finely ground pigment and/or filler in the ionizable resin herein referred to as the binder, the deposition of binder without pigment and/or filler or having very little of same, but which can be tinted if desired, and the deposition of other water reducible surface coating compositions containing the binder which might be considered to be broadly analogous to enamel, varnish, or lacquer bases, and the coating material for such deposition is termed a "paint." Thus, the binder, which is converted to a water-resistant film by the electrodeposition and ultimately converted to a durable film resistant to conventional service conditions by final curing, can be all or virtually all that is to be deposited to form the film, or it can be a vehicle for pigmentary and/or mineral filler material or even other resins on which it exerts the desired action for depositing the film.

The foregoing examples are solely for purposes of illustration and should not be considered as limitations upon the true scope of the invention as set forth in the appended claims.

We claim:
1. The method for protecting an electrically-conductive automobile body from corrosion which comprises immersing said body in a first aqueous coating bath having dispersed therein a paint in which the predominant fraction of the film-forming paint binder thereof is a synthetic polycarboxylic acid resin at least partially neutralized with a sufficient quantity of water soluble amino compound to maintain said resin as a dispersion of anionic polyelectrolyte in said bath, anodically depositing upon said body from said bath a continuous, essentially water-insoluble, film of said paint having an average depth in excess of about 0.5 mil, polymerizing said film of paint upon said body until said film has an average electrical resistance in excess of about 1 million ohm-cm., immersing the body in a chemical plating bath containing metal cations which are chemically reduced upon the painted surface of said body until a continuous, adherent, electrically-conductive layer of metal is formed thereon to an average thickness in the range of about 0.001 to about 0.01 mil, immersing said body in an aqueous coating bath having dispersed therein a paint in which the predominant fraction of the film-forming paint binder is a synthetic polycarboxylic acid resin at least partially neutralized with a sufficient quantity of water soluble amino compound to maintain same as a dispersion of anionic polyelectrolyte in said second aqueous coating bath, anodically depositing upon said layer of metal from said second aqueous coating bath a continuous, essentially water-insoluble film of paint having an average depth in excess of about 0.7 mil, providing electrical connection between said body and a direct current electrical power source, providing independent electrical connection between said layer of metal and said power source, and maintaining a body corrosion retarding difference of electrical potential between said body and said layer of metal.

2. The method of claim 1 wherein said body and said layer of matal are electrically connected to said power source in a manner such that said body is electrically negative in relation to said layer of metal.

3. The method of claim 1 wherein said body and said layer of metal are electrically connected to said power source in a manner such that said body is electrically positive in relation to said layer of metal.

4. The method of claim 1 wherein said layer of metal is nickel.

5. The method for protecting an electrically-conductive automobile body from corrosion which comprises immersing said body in a first aqueous coating bath having dispersed therein a paint in which the predominant fraction of the film-forming paint binder thereof is a synthetic polycarboxylic acid resin at least partially neutralized with a sufficient quantity of water soluble amino compound to maintain said resin as a dispersion of anionic polyelectrolyte in said bath, anodically depositing upon said body from said bath a continuous, essentially water-insoluble, film of said paint having an average depth in excess of about 0.3 mil, polymerizing said film of paint upon said body until said film has an average electrical resistance in excess of about 1 million ohm-cm., immersing the body in a chemical plating bath containing metal cations which are chemically reduced upon the painted surface of said body until a continuous, adherent, electrically-conductive layer of metal is formed thereon to an average thickness not substantially in excess of about 0.03 mil, immersing said body in an aqueous coating bath having dispersed therein a paint in which the predominant fraction of the film-forming paint binder is a synthetic.

6. The method of protecting an electrically-conductive automobile body from corrosion which comprises electrodepositing a first, continuous, coating of paint to an average thickness in excess of about 0.3 mil upon the surfaces of said body, polymerizing said first coating of paint upon said body to an electrical resistance in excess of about 1 million ohm-cm., applying upon the polymerized coating a continuous, adherent, electrically-conductive layer of metal having an average thickness not substantially in excess of about 0.03 mil, anodically depositing upon said layer of metal a continuous coating of paint to an average thickness in excess of about 0.3 mil, providing electrical connection between said body and a direct current electrical power source, providing independent electrical connection between said layer of metal and said power source, and maintaining body corrosion retarding difference of electrical potential between said body and said layer of metal.

References Cited
UNITED STATES PATENTS 3,151,050  9/1964  Wilburn _____ 204—196
3,408,278  10/1968 Stoodley _____ 204—181
3,449,229  6/1969  Freeman et al. _____ 204—181

HOWARD S. WILLIAMS, Primary Examiner

U.S. Cl. X.R.
204—30, 38, 196